Feb. 17, 1953  J. J. HORAN  2,628,911
METHODS AND DEVICES FOR MERCHANDISING AND
DIRECTLY DISPENSING LIQUID INFANT FOOD
Filed Sept. 5, 1947  3 Sheets-Sheet 1

INVENTOR.
John J. Horan

Patented Feb. 17, 1953

2,628,911

UNITED STATES PATENT OFFICE 2,628,911

METHODS AND DEVICES FOR MERCHANDISING AND DIRECTLY DISPENSING LIQUID INFANT FOOD

John J. Horan, Detroit, Mich.

Application September 5, 1947, Serial No. 772,237

19 Claims. (Cl. 99—171)

This invention relates to methods for dispensing liquid infant foods and to single service dispensers with which the methods may be employed.

It was formerly necessary for persons, who wished to feed infants under sterile conditions, to purchase raw milk or canned milk powders, liquids, or pastes, to mix these with other ingredients, to sterilize water and apparatus and sometimes even to boil milk to insure its purity, thus destroying part of its food value. This was a burdensome chore and in inexpert hands produced food of uncertain quality.

Packages in accordance with this invention are of the single service type, adaptable for production cheaply and in large quantities. They can be manufactured in or adjacent to food plants, such as canneries or dairies, and loaded and sealed, thence to be delivered by such channels as are now used for transportation of bottled or canned milk. These containers thereupon may then be used for dispensing the milk directly to infants.

This package includes an outer protective covering, a blown or molded plastic flask, a nipple, preferably of rubber or other plastic materials, and provides thereby a vehicle into which liquid infant food in concentration and quantity suitable for a single direct feeding may be loaded by a processing plant, and without transferring, be fed to an infant. The parent needs only to open the outer protective covering, remove the outer closure and insert the nipple in the infant's mouth.

After feeding, the discarded parts, or at least their adhesive qualities, having been damaged by the removal process, and the container being incapable of further disassembly without impairing the adhesive quality of other disjoined surfaces, the parts are thrown away.

An object of this invention is to provide a very light, inexpensive, disposable, single service, nipple bearing plastic shipping container as part of a package for one time machine filling with liquid infant food, sealable after loading at the processing plant, adapted to be used as a direct dispenser to an infant, and not resealable by hand after use without special tools or material.

An object of this invention is to provide a container which will eliminate haphazard home compounding of infant food and, by virtue of its low cost and adaptability to quantity production and loading, will permit large processing plants to engage in the manufacture of liquid infant food in large quantities and in the loading of this food in quantities and concentrations suitable for single direct feedings into containers in turn loaded into packages from which they can be readily removed and directly administered.

My invention makes use of recent developments in plastics which render the construction of this novel container entirely feasible.

Further objects and novel features will become apparent in the balance of the specification, in the claims appended and in the following description of the drawings in which:

Figure 1:
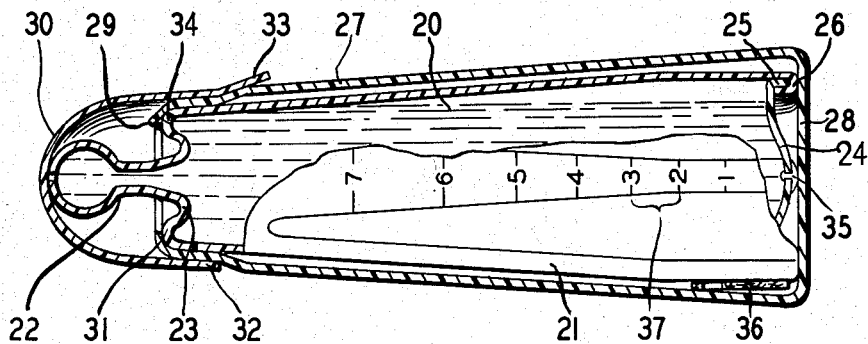
Fig. 1 is a view in partial section of a package in accordance with this invention.
Figure 2:
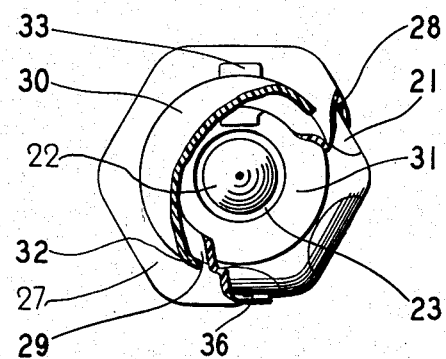
Fig. 2 is an end view partly cut away of the package illustrated in Fig. 1.

Referring now specifically to Figs. 1 and 2, the container body 21 is closed at the base by a disc 24 having a cupped edge 25 which is secured in the crimped over rim 26 of the body 21, before the container is filled, being thereto bonded by cement or heat sealed in a manner which causes the mating surfaces to soften and flow together. One end of a tab 36 is cemented to the body 21 adjacent the rim 26, the tab 36 having a pierced hole in its free end to permit suspension from a hook.

The outer protective covering 27 when designed to enclose a single container may be of waterproofed paper or of "Pliofilm" or other plastic. It is not by itself a complete covering, but acts in conjunction with the outer closure 30 to enclose the container entirely. The container body 21 is preferably rollably enwrapped in the covering 27, the surplus covering material, extending beyond the base rim 26 of the container body, being preferably left open until after the assembly has been filled, and the small amount of overhanging material 29 extending beyond the body shoulder 31 is merely folded inwardly.

The cup shaped outer closure 30 is then slipped over the open end 29 of the covering and the shoulder 31 as far as it will go, and is then preferably heat sealed in such a manner that a temporary bond is created between the mating surfaces of the rim 32 of the outer closure 30, and the protective covering 27, 29 on one side and the shoulder 31 on the other side. Optionally, of course, cementing of the individual surfaces may be resorted to.

The outer closure 30 has a projecting tear off tab 33 extending from its rim 32.

The shoulder 31 has a vent orifice 34, which remains blocked until the outer closure 30, 32 and the outer covering 27, 29 are removed. The nipple 22 is shown integral with the body 21 and shoulder 31 in the embodiment.

The nearly completed assembly is then preferably inverted and filled with liquid infant food 20 through the centrally located hole in the disc 24 which is then closed by a drop of low melting point material 35, after which the surplus covering material is folded over and heat sealed to form the closure 28.

The package represents in many respects a departure from commercial food packaging practice as heretofore known. However, it is now within the capacity of the plastics industry to produce the components and the completed container and even to provide the necessary molding machinery for producing the packages cheaply and in large quantities entirely within the plant of the formula processor, thereby economizing on shipping costs.

The shape of the container body 21, a hexagon tapering to a cylinder, is not essential to the design, but is easy to manufacture by molding or blowing and is pleasing in appearance. Graduations 37, applicable when the container material is transparent or translucent, permit observation of the quantity remaining in the container at any time during the feeding.

The outer closure 30 and the outer protective covering 27 may be stripped off quickly when the tab 33 is pulled, the container and contents being warmed for feeding either before or after the removal of the outer protective covering 27.

Figure 3:
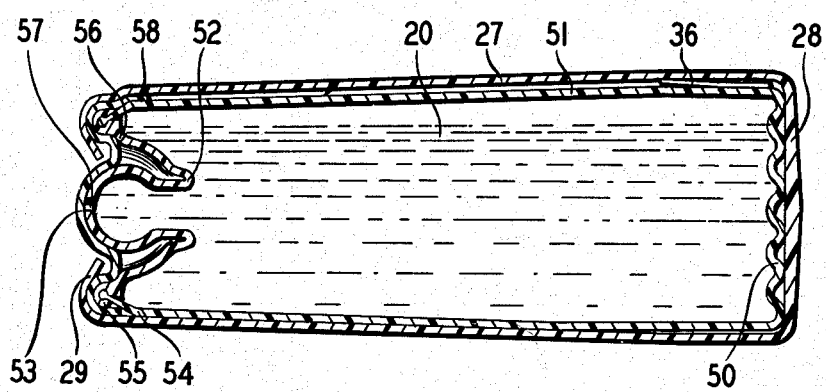
Fig. 3 is a sectional view of another form of package in accordance with this invention.
Figure 4:
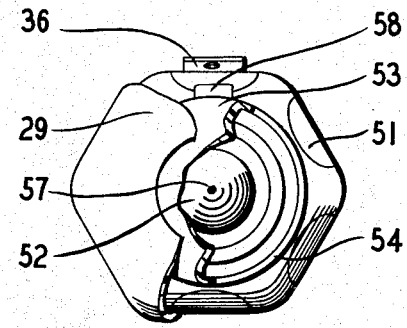
Fig. 4 is an end view partly cut away of the package illustrated in Fig. 3.

Referring now to Figs. 3 and 4, there is illustrated an alternative form of package having a single container 51 generally similar in appearance to that shown previously, except that the base 50 is integrally blown or molded with the body portion, and having a separate nipple 52 whose flange 55 is secured to the rim 54 of the container. The container holds a supply of liquid infant food 20.

A reentrant cap type closure 53 is provided for exterior protection of the nipple 52 from contamination. The design portrayed is such that the nipple 52 and cap 53 may be preassembled as a unit and the unit pressed down over the inwardly turned rim 54, which, being of material relatively rigid as compared with the soft nipple 52, buries itself into the flange 55 of the nipple 52.

The application of heat at this point, preferably dielectric heat, together with slight pressure, causes the softer material of the nipple flange 55 to flow slightly and to grip the rim 54 upon cooling so that there are created an excellent bond between the nipple flange 55 and the rim 54, and also a bond between the flange 55 and the cap 53, both bonds resisting the possibility of contamination from outside. The inside surface of the cap 53 may be coated with an inhibitor to prevent the possibility of creation of a too effective bond with the nipple flange 55.

The container is preferably filled as with the previous form through a closable filling hole in the base. Like the previous form it may be filled with a syringe which distends the nipple orifice 57, provided that the cap 53 and nipple 52 are assembled separately. Another method for filling this container is of course to do so from the open end before assembly of the nipple 52 and cap 53. I have, in the drawing, deliberately eliminated the base filling opening to emphasize the possibility of using other means of filling.

A suspension tab 36, as in the previous form, may be cemented to the body 51 adjacent the base 50.

The vent orifice 56 is located in the nipple skirt and, like the feeding orifice 57, is prevented from premature functioning by the presence of the cap 53.

The last operation is the application of the outer protective covering 27 which as shown is similar to that used with the previous form of package, although it need not necessarily be similar. The operation differs from the one previously described only in that the overhanging material 29 is cemented or heat sealed to the external surface of the cap 53 instead of being sandwiched between the cap and shoulder.

The person desiring to feed an infant strips off the outer covering 27, 28, 29 and the cap 53, the latter by means of the tab 58, freeing the orifices 56, 57, warms the container, and if necessary squeezes or shakes it to force the nipple 52 outward into the use position.

Figure 5:
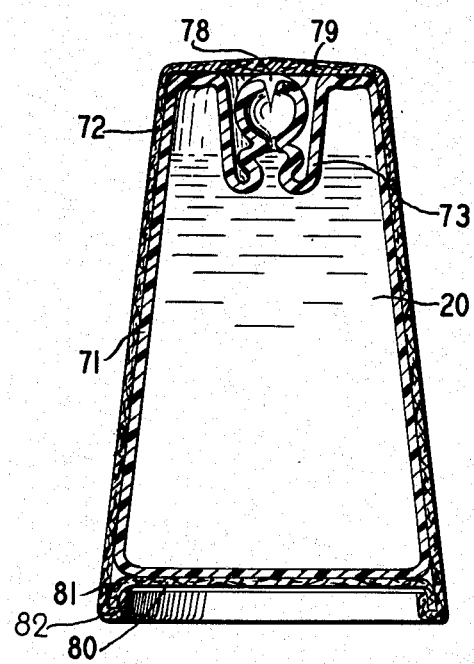
Fig. 5 is a sectional view of a third form of package in accordance with this invention.
Figure 7:
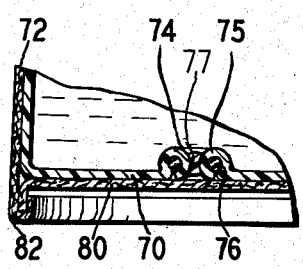
Fig. 7 is a fragmentary sectional view of a container similar, except as shown, to that illustrated in Figs. 5 and 6.
Figure 6:
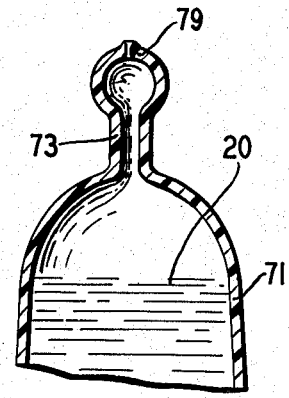
Fig. 6 is a partial view in section of the container shown in Fig. 5 when removed from the outer covering.

Referring now to Figs. 5, 6 and 7, there is illustrated a package for merchandising and dispensing liquid infant food 20, comprising generally a flexible inner envelope or bag 70 or 71 constructed of rubber or soft plastic in a manner resembling in some respects that adapted to the manufacture of inflatable balloons, and an exterior protective covering or jacket 72. Both bags shown have an integral nipple molded at one end. Two constructions are most feasible, one 71 being filled through the nipple orifice 79, the other 70 having a filling opening 74 at the opposite end or base of the bag 70.

Referring specifically to the former as illustrated in Figs. 5 and 6, the nipple 73 corresponds to the mouth of a balloon and has considerably thicker walls than the rest of the bag 71. After manufacture of the bag 71 a trimming or snipping operation is sometimes necessary at the orifice, leaving the free form of the orifice 79 appearing as illustrated in Fig. 6. The filling of the bag with liquid infant food 20 is done by means of a syringe or syrette type fitting which temporarily distends the orifice 79. The orifice 79 is then plugged with a removable pin 78, and the loaded bag 71 is inverted into the jacket 72, after which the closure disc 80 is pressed into place and engaged at its cupped periphery 81 under the crimped rim 82 of the jacket 72 in which position the periphery 81 may be crimped or heat sealed to the rim 82.

Referring to the latter form as illustrated in Fig. 7, the filling orifice 74 corresponds to the mouth of a balloon and the edge 75 is preferably rolled around a small band 76 which, when released, contracts and closes the opening 74. Filling is preferably by means of a syringe or syrette type fitting which temporarily distends the opening 74 and is preferably performed with the bag 70 already in place in the jacket 72. The opening 74 may then be sealed if desired with a drop of cement 77 or may be left pressure closed only, facilitating the injection of such additaments as may be prescribed by the infant's physician. The nipple orifice is pierced and closed by a pin 78 similar to that used in the previous form. The nipple and adjacent walls in this form are also of greater thickness than the balance of the bag 70.

The jacket 72 and closure disc 80 are preferably of rigid molded or blown plastic. A substitute form is that of the well known paper drinking cup or ice cream cup construction, the paper being suitably impregnated with a water resistant compound to prevent external contamination from penetrating to the bags 70 or 71.

The parent needs only to warm the package, tear and strip off the jacket 72 and disc 80, and remove the pin 78 before feeding. No vent is necessary since the flexible walls of the container collapse as fluid is withdrawn by the infant. The package is, of course, incapable of practicable cleaning, repair and reuse.

All forms of packages here illustrated may employ plastic materials throughout. The most suitable plastics for containers, closures etc., are generally the thermoplastic types, because of the ease with which components may be manufactured and because they lend themselves to heat flowing and sealing. Thermosetting materials may be used; but they generally require separately applied adhesives to join surfaces together. The most suitable materials for the container bodies appear to be the translucent or transparent thermoplastics.

Rubber, a plastic which is suitable also for many parts, falls strictly into neither of these classifications, but various forms of resilient and hard rubbers may be used for the several parts.

Plastic materials low in water absorption give greater protection to the food within and are most desirable, because the formula, once sterilized, when loaded into sterilized containers made of such materials will keep fresh longer under more adverse conditions.

While paper has been mentioned as usable for external coverings, its only advantage lies in less cost. Unless thoroughly impregnated, papers are highly water absorbent. The effectiveness of any paper part in delaying spoilage is an inverse function of the permeability of the part to water and air transmission.

I prefer that the following method be used for producing filled and sealed packages in accordance with this invention:

Form the container body in a soft state and allow to cool, assemble all end closures and the outer protective covering, leaving the covering unsealed over the filling opening, sterilize the liquid infant food and sterilize the above assembly again if necessary, load the food through the filling opening, seal the filling opening with hardenable sealant, seal the outer covering over the filling opening.

While there have been shown and described what are at present considered to be the preferred forms of this invention, it will be obvious to those skilled in the art that various changes and modifications may be made thereto, and combinations therewith, without departing from the true scope of this invention; and it is accordingly intended in the appended claims to cover such equivalents as may fall within the true scope of the invention and without the prior art.

I claim:

1. A method of providing complete dispensers for supplying liquid food to infants, comprising the following major steps: forming a body in a soft state from liquid material and permitting said body to solidify; assembling end closures and an outer protective covering to form a partial assembly having a nipple therein, a filling opening being left unsealed; sterilizing liquid infant food, and, if necessary, resterilizing the partial assembly; loading said food through said filling opening; sealing said filling opening with hardenable sealant; and sealing said outer protective covering over said filling opening.

2. A package comprising: a container having a supply of liquid infant food therein; a nipple positioned at one end of said container; and a closure adherently attached to said container external to said nipple.

3. A package as in claim 2, said package being incapable of disassembly by hand without rendering it useless for hand reassembly without aids.

4. A package as in claim 2, said nipple having an orifice therein, said nipple being depressed into the container by the presence of said closure, said closure initially obturating said orifice, said orifice being unblocked upon the removal of said outer closure.

5. A package comprising: a container having a supply of liquid infant food therein; a nipple positioned at one end of said container; a closure external to said nipple, said closure being removable from said container; and a suspension member at the opposite end of said container, said suspension member being adapted for holding said container in an inverted position during feeding.

6. A package comprising: a container having a supply of liquid infant food therein; a nipple positioned at one end of said container; and closure means adherently built up of sheet material over said container and enclosing said container and nipple.

7. A package as in claim 6, said nipple having an orifice initially closed by an obturating element, said element being detachable from said nipple.

8. A package comprising: a container having a supply of liquid infant food therein; a nipple positioned at one end of said container; and a closure adherently attached to said container external to said nipple, said closure being destructibly removable to provide feeding access to said nipple.

9. A package comprising: a container having a supply of liquid infant food therein; a nipple positioned at one end of said container; and a closure adherently attached to said container external to said nipple, said nipple being inwardly collapsed and restrained in a collapsed position by the interior surface of said closure, said nipple being capable of extension from said flask for feeding purposes upon the removal of said closure.

10. A package for commerce comprising: a container having a supply of liquid infant food therein; an integral nipple positioned at one end of said container; and closure means adherently attached to said container and enclosing said container and nipple.

11. The process of preparing a package for commerce comprising the following steps: adherently attaching to one end of a vessel a closure array comprising a nipple and an external covering for said nipple; injecting through an opening in the vessel a quantity of liquid infant food; adherently closing said opening; and enclosing said vessel and closure array in an outer protective enclosure.

12. A package for commerce comprising: a container having therein a supply of liquid infant food; a nipple at one end of said container, said nipple being substantially integral with said container; and outer covering means comprising moisture resistant organic sheet material adherently fabricated in place as an enclosure for said container and nipple.

13. A package as in claim 12, said enclosure having projecting therefrom a tab, whereby said tab may be graspingly lifted in order to concentrate stress in said sheet material of said enclosure adjacent to said tab, and said enclosure may thus be destroyed and removed from said container.

14. A package as in claim 12, said container having an opening therein adapted for insertion therethrough of said food; and a small amount of hardened sealant closing said opening.

15. A package as in claim 12, said container having an opening therein adapted for insertion therethrough of said food; and a small closure secured in said opening.

16. A package for commerce comprising: a thin walled resilient container having therein a supply of liquid infant food; a nursing nipple at one end of said container; and an enclosure for said container and nipple, said enclosure having been fabricated from thin walled flexible material adherently seamed in place over said container.

17. A package as in claim 16, said container having an adherent seal at the point of admission of said food.

18. A package for commerce comprising: a container having therein a supply of liquid infant food; a nipple substantially integral with said container, said nipple having an orifice therein; an obturating element closing said nipple; and closure means external to said nipple, said closure means being adherently secured in place over said container, said closure means exerting compressive force upon said nipple, said compressive force causing said nipple to be depressed toward said container, said obturating element being retained in place against premature release from said nipple by said closure means.

19. A package comprising: a container built up from adherently seamed water resistant semi-rigid organic material, said container being closed at one end; a nipple closing the other end thereof, said container having therein a supply of liquid infant food, said container and nipple being enwrapped in an adherently seamed outer enclosure also fabricated from water resistant organic material, said enclosure being destructibly removable to provide sucking access to said food.

JOHN J. HORAN.

REFERENCES CITED

The following references are of record in the file of this patent:

UNITED STATES PATENTS

| Number | Name | Date |
| --- | --- | --- |
| 609,415 | Coulborn et al. | Aug. 23, 1898 |
| 1,344,760 | Goddard | June 29, 1920 |
| 1,623,544 | Kushner | Apr. 5, 1927 |
| 1,866,036 | Hartman et al. | July 5, 1932 |
| 2,090,749 | Corsi et al. | Aug. 24, 1937 |
| 2,093,130 | Kurkjian | Sept. 14, 1937 |
| 2,108,114 | Foard, Jr. | Feb. 15, 1938 |
| 2,158,837 | Schukraft | May 16, 1939 |
| 2,298,545 | Waters | Oct. 13, 1942 |
| 2,432,496 | Beason | Dec. 16, 1947 |
| 2,460,329 | Allen et al. | Feb. 1, 1949 |